UNITED STATES PATENT OFFICE.

JOHN D. BECKER, OF PEORIA, ILLINOIS.

BRONZE.

SPECIFICATION forming part of Letters Patent No. 490,706, dated January 31, 1893.

Application filed April 14, 1892. Serial No. 429,201. (No specimens.)

*To all whom it may concern:*

Be it known that I, JOHN D. BECKER, a citizen of the United States, residing at Peoria, in the county of Peoria and State of Illinois, have invented certain new and useful Improvements in Bronzes; and I do hereby declare the following to be a full, clear, and exact description of the invention, such as will enable others skilled in the art to which it appertains to make and use the same.

This invention relates to new and useful compositions in bronzes for frescoing and the like of which the following is a specification.

My composition consists of the following ingredients combined in the proportions stated, viz, one ounce bronze one dram glycerine five minims carbolic acid one-fourth ounce gum arabic three minims musk.

The parts must be mixed as follows: The carbolic acid is put into the glycerine, then the bronze is thoroughly mixed with that after which the gum arabic is dissolved in enough water to make a thick paste and finally the musk is added. This is the only way it can be prepared. The ingredients are then to be thoroughly mingled by stirring.

The bronze made in the proportion above specified has rather a pasty consistency and is thinned for use by the addition of water.

It is a well known fact that bronze ordinarily used for the purposes of frescoing &c., after being applied tarnishes after about twenty four hours but by the use of the particular ingredients above set forth the bronze retains its brilliant luster continually and this is not asserted before giving and having a thorough and complete test. The bronze usually employed also dries up in a very short period of time but by the said ingredients above set forth this bronze remains in a plastic state until mixed with water and applied to the parts to be decorated when it dries the same as in other bronzes also the bronze after a severe test works much better in lining &c than any bronze I am at this time aware of.

I am not aware of a bronze heretofore made with the ingredients or the proportions specified and therefore—

What I claim and desire to secure by Letters Patent is,

The herein described composition of matter forming a bronze for frescoing and other purposes consisting of bronze, glycerine carbolic acid, gum arabic and musk in the proportions specified.

In testimony whereof I affix my signature in presence of two witnesses.

JOHN D. BECKER.

Witnesses:
  E. J. SLOUGH,
  A. KEITHLEY.